US008057774B2

(12) United States Patent
Kim et al.

(10) Patent No.: US 8,057,774 B2
(45) Date of Patent: Nov. 15, 2011

(54) MANUFACTURING METHODS OF MESOPOROUS CARBON STRUCTURE WITH SPRAY DRYING OR SPRAY PYROLYSIS AND COMPOSITION THEREOF

(75) Inventors: Sang Ho Kim, Daejeon (KR); Won Jong Kwon, Daejeon (KR); Hyun-Ho Lee, Daejeon (KR); Sunmi Jin, Daejon (KR); Jaehong Kim, Seoul (KR); Kwonnam Sohn, Seoul (KR); Ji Won Suk, Seoul (KR); Byung-Hee Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 240 days.

(21) Appl. No.: 12/312,816

(22) PCT Filed: Dec. 10, 2007

(86) PCT No.: PCT/KR2007/006391
§ 371 (c)(1),
(2), (4) Date: May 28, 2009

(87) PCT Pub. No.: WO2008/069633
PCT Pub. Date: Jun. 12, 2008

(65) Prior Publication Data
US 2009/0304570 A1 Dec. 10, 2009

(30) Foreign Application Priority Data

Dec. 8, 2006 (KR) .................. 10-2006-0124570
Dec. 7, 2007 (KR) .................. 10-2007-0127075

(51) Int. Cl.
*C01B 31/00* (2006.01)
*C01B 31/02* (2006.01)
(52) U.S. Cl. ..................... 423/445 R; 977/775; 977/896
(58) Field of Classification Search ................. None
See application file for complete search history.

(56) References Cited

U.S. PATENT DOCUMENTS
4,263,268 A 4/1981 Knox et al.
(Continued)

FOREIGN PATENT DOCUMENTS
JP 2003-327473 11/2003
KR 10-2002-0025354 A 4/2002
(Continued)

OTHER PUBLICATIONS

Suslick et al.; Porous Carbon powders Prepared by Ultrasonic spray Pyrolysis; J. Am. Chem. Soc.; 128, pp. 12642-12643.*

(Continued)

*Primary Examiner* — Melvin Mayes
*Assistant Examiner* — Guinever Gregorio
(74) *Attorney, Agent, or Firm* — McKenna Long & Aldridge LLP (57) ABSTRACT

Disclosed is a method for preparing a porous carbon structure, the method comprising the steps of: (a) mixing a carbon precursor, a pyrolytic template, which is pyrolyzed at the carbonization temperature of the carbon precursor or removed by post-treatment after the carbonization of the carbon precursor so as to form pores, and a solvent, to prepare a spray solution; and (b) subjecting the spray solution either to spray pyrolysis or to spray drying and then spray pyrolysis, so as to form a carbonized carbon structure, and then removing the template from the carbon structure. A mesoporous spherical carbon prepared according to the disclosed method may have a large specific surface area and a large pore volume through the control of the kind and concentration of template, and thus can be used in a wide range of applications, including catalysts, adsorbents, electrode materials, materials for separation and purification, and materials for storing hydrogen and drugs.

14 Claims, 4 Drawing Sheets

U.S. PATENT DOCUMENTS 6,288,803 B1    9/2001    Hattori et al.
6,297,293 B1 *   10/2001    Bell et al. ..................... 521/99

FOREIGN PATENT DOCUMENTS

KR    10-2002-0097295 A    12/2002
KR    10-2004-0064056 A    7/2004
KR    10-2005-0014033 A    2/2005

OTHER PUBLICATIONS

Corma, Avelino; "From Microporous to Mesoporous Molecular Sieve Materials and Their Use in Catalysis" Chem. Rev. 1997, 97, 2373-2419; (Revised Manuscript).

* cited by examiner

MANUFACTURING METHODS OF MESOPOROUS CARBON STRUCTURE WITH SPRAY DRYING OR SPRAY PYROLYSIS AND COMPOSITION THEREOF

This application is a 35 U.S.C. §371 National Stage entry of International Application No. PCT/KR2007/006391, filed on Dec. 10, 2007, and claims the benefit of Korean Application No. 10-2006-00124570, filed on Dec. 8, 2006 and Korean Application No. 10-2007-0127075, filed on Dec. 7, 2007, all of which are hereby incorporated by reference in their entirety.

TECHNICAL FIELD

The present invention relates to a method for preparing a mesoporous spherical carbon structure, having a large specific surface area and a fine pore size.

BACKGROUND ART

Nanoporous materials, having a large specific surface area and uniform nanopores, can be used in various applications, including catalysts, adsorbents, electrode materials, and materials for separation and purification [see Corma, A. Chem. Rev., 1997, 97, 2373]. Typical methods for synthesizing porous carbon materials include the following: (1) subjecting carbon to a chemical activation process, a physical activation process or a combination thereof; (2) activating a carbon precursor with a metal catalyst or an organometallic catalyst; (3) blending a pyrolytic polymer with a carbonizing polymer and carbonizing the blend; (4) carbonizing an aerogel polymer synthesized in supercritical drying conditions.

Recently, methods of synthesizing carbon materials using inorganic templates have been reported by many research groups, and a general method of preparing porous carbon particles using templates is as follows. Specifically, this method comprises forming a template/carbon precursor composite in the liquid state, carbonizing the carbon precursor through heat treatment, and then removing the template. This template synthesis method has an advantage in that it is easy to introduce pores into carbon, but the method has problems in that it is difficult to prepare the template, and the process is complicated and time-consuming. Particularly, if the uniform mixing of the carbon precursor with the template in the liquid state is not achieved, pore structures in the resulting porous carbon particles cannot be uniform, and a desired pore size and shape cannot be obtained. Also, in order to apply the porous carbon particles as products, additional steps, including crushing, grinding and agglomeration, are required. For this reason, in the art, there is a need to develop a novel preparation method which minimizes the time, cost and preparation steps required in the preparation process.

DISCLOSURE OF THE INVENTION

It is an object of the present invention to develop a method for synthesizing a porous spherical carbon structure, which is simpler than the prior method and allows the pore size and porosity of the carbon structure to be freely controlled.

To achieve the above object, according to one aspect of the present invention, there is provided a method for preparing a porous carbon structure, the method comprising the steps of: (a) mixing a carbon precursor, a pyrolytic template, which is pyrolyzed either at a temperature range in which the carbon precursor is carbonized or at a temperature below the temperature range, and a solvent, to prepare a spray solution; (b) subjecting the spray solution either to spray pyrolysis or to spray drying and then spray pyrolysis.

According to another aspect of the present invention, there is provided a method for preparing a porous carbon structure, the method comprising the steps of: (a) mixing a carbon precursor, a hard template and a solvent to prepare a spray solution; (b) subjecting the spray solution either to spray pyrolysis or to spray drying and then spray pyrolysis, so as to form a carbonized carbon structure/hard template composite; and (c) removing the hard template from the carbonized carbon structure/hard template composite.

According to yet another aspect of the present invention, there is provided a composition for forming a porous carbon structure for spray drying, the composition comprising a carbon precursor, a template for forming pores, and a solvent.

According to still yet another aspect of the present invention, there is provided a method for controlling the pore size, specific surface area or both of a porous carbon structure in a process of preparing the porous carbon structure by spray-pyrolyzing a carbon precursor-containing solution containing a template, which is pyrolyzed at the carbonization temperature of the carbon precursor or is removed by post-treatment after carbonization so as to form pores, wherein the method comprises controlling the content of the template.

According to the present invention, porous carbon structures (particles) having various pore sizes and porosities can be provided through the use of a pore-forming template, which is pyrolyzed at the carbonization temperature of a carbon precursor or is removed by post-treatment after carbonization so as to form pores.

BEST MODE FOR CARRYING OUT THE INVENTION

Hereinafter, the present invention will be described in detail.

The present invention provides a novel method for preparing mesoporous spherical carbon particles, having a pore size of 1-100 nm and a large specific surface area. More specifically, according to the present invention, porous carbon particles are more easily produced with high productivity by forming carbon precursor balls through spray drying and/or spray pyrolysis and then removing a template during or after a carbonization process.

Prior spray drying is a process used in the production of milk powder, ceramics, drugs, etc., and is a process of forming particles by spraying a particle precursor solution into a high-temperature chamber and removing the solvent from the formed liquid droplets. This process has been widely used to date for the production of products, since it was developed in the 1800s. It was verified that, according to this process, particles are formed in a yield of 80-99%. For application to adsorbents, filters, electrode materials and the like in practice, materials need to be processed into suitable sizes and shapes, and in addition, need to be formed into a spherical shape, because the spherical shape is generally superior to an amorphous shape in terms of performance. The use of the above-described spray drying or spray pyrolysis method allows spherical particles having a desired size to be prepared at the same time, and thus has the advantage of eliminating the need to conduct additional forming processes, including crushing, grinding and agglomeration, for the application of the particles as products. In fact, the use of the above-described spray drying or spray pyrolysis method allows the preparation of spherical particles having a particle size ranging from 500 nm to 1000 μm.

According to the present invention, a porous carbon structure is prepared using a pore-forming template through the spray drying or spray pyrolysis process. Specifically, a mesoporous carbon structure can be easily formed through the use of a template, which is pyrolyzed at the carbonization temperature of a carbon precursor or is easily removed by post-treatment with, for example, water, an acid or a base, after the carbonization of the carbon precursor.

Also, in the present invention, pores in the carbon structure are formed either by pyrolyzing the template during the carbonization of the carbon precursor or through post-treatment after the carbonization process. Thus, the present invention has an advantage in that the pore size and porosity of the porous carbon structure can be freely controlled by controlling the kind, shape, size and/or content (concentration) of a template to be used (see Examples 1 to 7).

According to the present invention, the porous carbon structure can be prepared in the same manner as in any conventional preparation method, for example, the spray drying method and/or the spray pyrolysis method, except that the present invention employs a template, which is pyrolyzed at the carbonization temperature of a carbon precursor or is easily removed by post-treatment with, for example, water, an acid or a base, after the carbonization of the carbon precursor.

1) A first embodiment of the present invention employs a soft template which is pyrolyzed in a temperature range in which a carbon precursor is carbonized. When such a template is used, the carbon precursor contained in a spherical carbon precursor/pyrolytic template composite can be carbonized and crystallized and, at the same time, the soft template can form a pore structure, thus promoting the simplicity and easiness of the preparation process.

In a preferred example of the first embodiment, a carbon precursor, a soft template, which is pyrolyzed in a temperature range in which the carbon precursor is carbonized or at a temperature below the temperature range, and a solvent, are mixed with each other to prepare a spray solution. Then, the spray solution is spray-dried and then spray-pyrolyzed at a suitable temperature in a suitable atmosphere or is spray-pyrolyzed, thus preparing a carbon structure having pores developed therein.

Herein, the pyrolytic template can be used without limitation on the type and component thereof, as long as it can be pyrolyzed in a temperature range in which the carbon precursor is carbonized or at a temperature below the temperature range, thus forming pores. For example, any conventional surfactant known in the art may be used. The surfactant is an amphiphilic substance having both hydrophobicity and hydrophilicity. It can form spherical micelles through self-assembly depending on pH and, at the same time, is easily decomposed into oligomers or mono-molecules, and thus it is useful as the template.

Non-limiting examples of templates available in the present invention include cationic surfactants, anionic surfactants, non-ionic surfactants, amphoteric surfactants, and mixtures thereof. The cationic surfactants are not specifically limited, as long as they ionize in solution to give cations. Specific examples of the cationic surfactants include quaternary ammonium salts, imidazolium salts, pyridinium salts, quinolinium salts, isoquinolinium salts, polyethyleneimine, polyprolyleneimine, polyallylamine, polylysine, polyamine, and mixtures thereof. Also, the anionic surfactants are not specifically limited, as long as they ionize in solution to give anions, and specific examples thereof include alkyl sulfates, alkyl sulfonates, alkyl carboxylates, alkylbenzene carboxylates, alkylbenzene sulfonates, and mixtures thereof. Specific examples of the non-ionic surfactants include polyethylene oxides (PEO), polypropylene oxides (PPO), poly(ethylene oxide)-(propylene oxide) block copolymers, polyethylene glycols, and mixtures thereof. Specific examples of the amphoteric surfactants include amino acids.

Also, the carbon precursor has no specific limitation on the component and type thereof, as long as it is carbonized to carbon after pyrolysis. An example thereof is a polymer or a polymer precursor, which are carbonized to carbon after pyrolysis.

Non-limiting examples of the carbon precursor include phenol-aldehyde resin, urea-aldehyde resin, aniline-aldehyde resin, polyimide, polyacrylonitrile, polystyrene, polydivinylbenzene, polyvinylpyridine, polypyrrole, polythiophene, polyaniline, perfuryl alcohol, polyacrylamide, cellulose, sugar, sugar polymers, carbohydrates, and copolymers or mixtures thereof.

A solvent or dispersant for dissolving or dispersing the above-described carbon precursor and template is not specifically limited, but it is preferable to use a solvent or a dispersant, which can achieve the uniform dissolution and mixing of the carbon precursor and the template, and then can be easily removed from the mixture. Non-limiting examples of the solvent include: water, alcohols, such as ethanol and methanol, acetone, tetrahydrofuran, methylene chloride, chloroform, dimethylformamide, N-methyl-2-pyrrolidone (NMP), cyclohexane, dichloromethane, dimethyl sulfoxide (DMSO), acetonitrile, pyridine, amines, mixtures thereof. Preferred is water.

The composition ratio between the carbon precursor and the template in the spray solution is not specifically limited and can be suitably controlled to provide a desired pore size and porosity.

Also, the above-described spray solution may contain conventional additives known in the art, such as a crosslinking agent or a catalyst, in order to aid the polymerization, crosslinking and carbonization of the carbon precursor. Preferably, the weight ratio of carbon precursor (w):template (x):other additives (y):solvent (z) is $1 \leq w \leq 70 : 0 \leq x \leq 50 : 1 \leq y \leq 70 : 1 \leq z \leq 99$, wherein $w+x+y+z=100$.

The spray solution prepared as described above is treated with ultrasonic waves or an atomizer to form micrometer-sized liquid droplets, then introduced by carrier gas nitrogen into a chamber or a furnace, which are maintained at a suitable temperature.

Herein, a method for forming the liquid droplets may be any conventional method known in the art, and non-limiting examples thereof an ultrasonic method, an electrospray method and a nebulizer method. Also, the diameter of the liquid droplets is determined depending on the liquid droplet preparation method and is also connected with the diameter of the resulting porous carbon particles. Thus, it is preferable to suitably control the diameter of the liquid droplets depending on the liquid droplet forming method, the composition ratio between the carbon precursor and the template, and the kind of solvent.

As the liquid droplets are passed through the chamber or the furnace, the solvent is evaporated, while spherical particles consisting of a mixture of the carbon precursor and the template are formed. When the spherical particles are pyrolyzed in a high-temperature furnace, the carbonization of the carbon precursor occurs. In this process, the pyrolyzable soft template (organic template) can be pyrolyzed at the same time as the carbonization, thus providing spherical carbon particles having pores developed therein.

The pyrolysis temperature range is not specifically limited, as long as it is higher than a temperature at which the carbonization of the carbon precursor occurs. For example, it may be in the range of 300-1500° C. Herein, the pyrolysis temperature can vary depending on the kind of carbon precursor used.

2) A second embodiment of the present invention employs a hard template, which can be removed through post-treatment after the carbonization of the carbon precursor. This hard template has an advantage in that it can be used regardless of a temperature range in which the carbon precursor is carbonized.

In a preferred example of the second embodiment, a carbon precursor, a hard template and a solvent are mixed with each other to prepare a spray solution. Then, the spray solution is carbonized through spray pyrolysis, and then the template is removed from the formed carbon structure.

As the hard template, any material may be used without special limitation, as long as it is stable during the carbonization of the carbon precursor and can be easily removed through post-treatment. For example, it may be a metal oxide, a metal salt or a mixture thereof, which can be removed through a dissolution or etching process after the carbonization process.

Particularly, when the metal salt is used, a mesoporous carbon structure can be prepared by mixing the metal salt with the carbon precursor without the need to form a template from a material which can provide the template, spraying the mixture without separate treatment to form a micro-scale particle, and then removing the formed nano-scale template from the particle by spontaneous phase separation. Thus, there are advantages in that the process can be more simplified compared to the prior preparation method, and in addition, a mesoporous carbon structure, which was difficult to obtain using the prior preparation method, can be easily prepared.

Non-limiting examples of metal oxides, which can be used in the present invention, include silica sol (silica nanoparticle), alumina, titania, and mixtures thereof. Also, the metal salt may be a salt containing at least one metal selected from the group consisting of alkali metals, alkaline earth metals and transition metals, which are conventionally known in the art, and examples thereof include $NaCl$, $KCl$, $Na_2SO_4$, $K_2SO_4$, $NaNO_3$, $KNO_3$, $NaHCO_3$, $Na_2CO_3$, $MgSO_4$, $CaSO_4$, $Mg(NO_3)_2$, $Ca(NO_3)_2$, $FeCl_3$, $MnCl_2$, $ZnCl_2$, $FeSO_4$, $Fe(NO_3)_3$, etc.

The second embodiment is carried out in the same manner as in the first embodiment, except that the hard template is used. Specifically, the spray solution prepared as described in the first embodiment is treated to form micrometer-sized droplets, which are then introduced by carrier gas nitrogen or air into a chamber or a furnace, which are maintained at a suitable temperature. When a chamber, which is maintained at a specific temperature range (e.g., 50-300° C.), is used, the solvent is volatilized from the liquid droplets, while a dried carbon precursor-template composite is formed. When the dried carbon precursor-template composite is subjected to high-temperature pyrolysis at 300-1500° C., the carbon precursor is carbonized to carbon, and the template remains without being pyrolyzed, thus forming a carbon-template composite.

Herein, the drying and the carbonization can be carried out in two steps or can be carried out simultaneously in a one-step process. When the carbon-template composite thus prepared is treated with water, an acid or a base, the template is removed, thus forming a developed pore structure. For example, when the silica template is used, it can be removed by an HF or NaOH solution after the formation of a carbon-silica composite, and when the metal salt is used, it can be removed by dissolving it in water, whereby a pore structure developed in carbon particles can be formed.

Particularly, in the case of the carbon-hard template composite, the order in which the template removal process and the carbonization are carried out is very important. In the case where the carbonization process is carried out after the template is removed from the carbon-template composite, the template in the composite is dissolved during the template removal process to collapse the composite structure, thus making it impossible to obtain a spherical carbon structure. Even if an insoluble solvent is used to maintain the porous structure of the carbon precursor until the template is removed, phenomena, such as the dissolution of the carbon precursor or the transition of glassy materials, occur during the carbonization to collapse the porous structure and to partially clog the pores, thus remarkably reducing the specific surface area of the resulting carbon structure (see Comparative Example 1 and FIG. 6).

Unlike this, in the present invention, after the carbon structure is completely formed by carbonization, the template is removed to form pores. Thus, the present invention has an advantage in that the specific surface area of the porous carbon structure can be increased, because the pore structure can be developed in a state in which the composite structure is maintained without changes. Also, the present invention has advantages in that the pore size and porosity of the porous carbon particles can be freely controlled by controlling the kind, type, size and/or content (concentration) of template to be used, and if necessary, the template can partially remain.

In another aspect, the present invention provides a porous carbon structure prepared according to the above-described method.

Herein, the porous carbon structure contains a plurality of pores, preferably mesopores, and may have a porous structure in which the pores are linked with each other. Also, the pore size and porosity of the carbon structure are not specifically limited. For example, the pore size may be in the range of 1 nm to 100 nm, and the porosity may be in the range of 0-90%. Furthermore, the pore volume of the carbon structure is also not specifically limited. The particle size of the porous carbon structure thus prepared is not specifically limited, but is preferably in the range of 20 nm to 1000 μm.

An increase in the porosity of the carbon particles is associated directly with an increase in the specific surface area of the carbon particles. Thus, the inventive method for preparing the porous carbon particles can be used for the purpose of increasing the specific surface area of the particles, in addition to controlling the porosity of the particles. In the present invention, it is possible to suitably control the specific surface area of the particles depending on the kind, size, content and ratio of template used, and the porous carbon particles of the present invention may have a specific surface area range which is generally in the art.

The porous carbon particles according to the present invention can be used in various applications, for example, fillers, battery additives, filtering materials, insulation materials, separating materials, catalysts, sensors and catalyst particle carriers.

In still another aspect, the present invention provides a composition for forming a porous carbon structure for spray drying, the composition comprising a carbon precursor, a template for forming pores, and a solvent.

Herein, the template may be: (a) a soft template, which can be pyrolyzed at the carbonization temperature of the carbon precursor to form pores; a hard template, which is not pyrolyzed at the carbonization temperature of the carbon precursor and can be removed by post-treatment to form pores; or a mixture thereof.

In yet another aspect, the present invention provides a method for controlling the pore size, specific surface area or both of a porous carbon structure in a process of preparing the porous carbon structure by spray-pyrolyzing a carbon precursor-containing solution containing a template, which is pyrolyzed at the carbonization temperature of the carbon precursor or is removed by post-treatment after carbonization so as to form pores, wherein the method comprises controlling the content of the template.

In fact, in the present invention, it could be seen that the porosity, pore size and specific surface area of the porous carbon structure could be freely controlled by variously changing the property, content and the like of the template (see Examples 1 to 7).

Hereinafter, the present invention will be described in further detail with reference to the following examples and test examples. It is to be understood, however, that these examples and test examples are illustrative only, and the scope of the present invention is not limited thereto.

EXAMPLE 1

Figure 1:
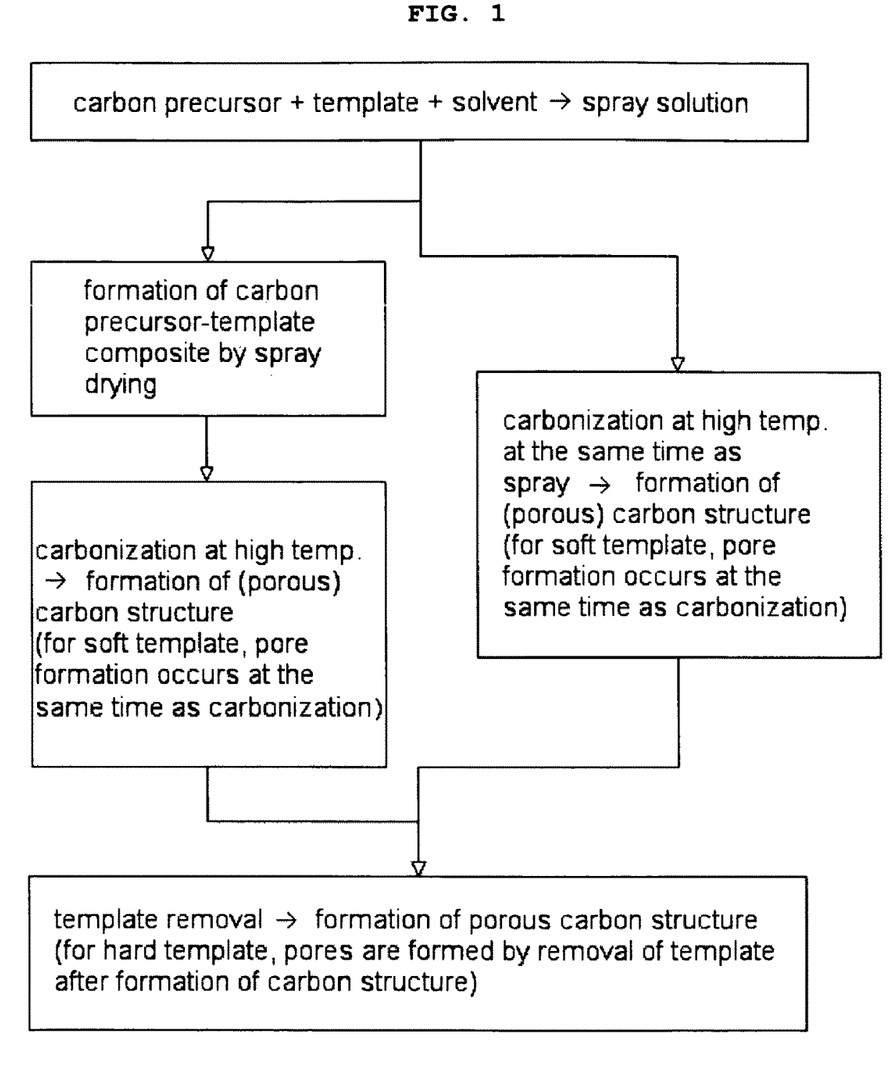
FIG. 1 is a schematic diagram showing a process of preparing porous carbon particles using spray drying or spray pyrolysis.
Figure 2:
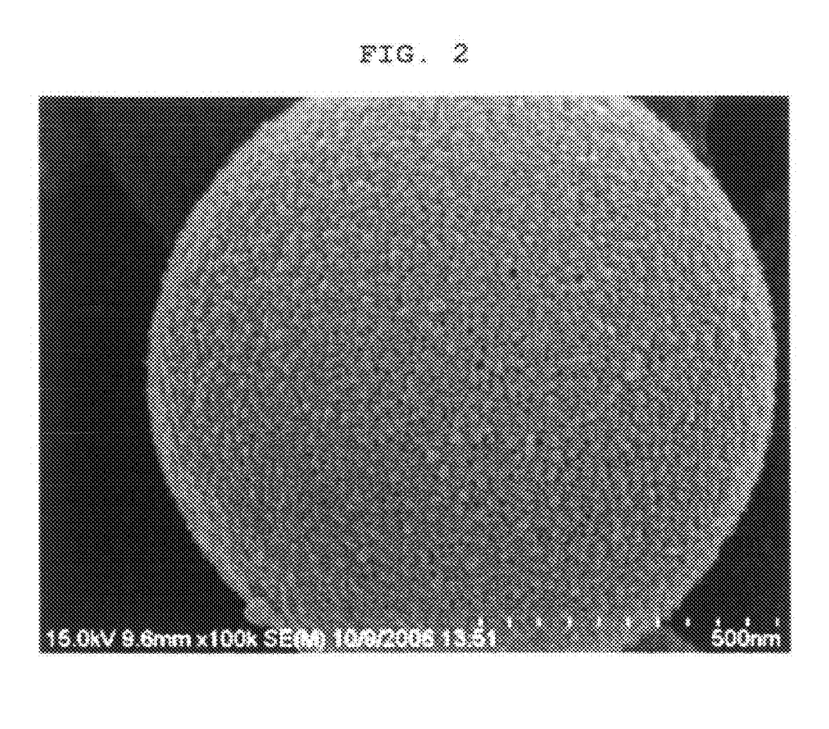
FIG. 2 is a scanning electron microscope (SEM) image of porous carbon particles prepared according to Example 1.

5 g of sucrose and 8 g of silica particles (Ludox AS-40) having an average particle size of about 10 nm were dissolved in 80 ml of water at room temperature, and then 4 ml of concentrated sulfuric acid was added slowly thereto. The solution was stirred for 12 hours, and then nitrogen having a temperature of 150° C. was blown into the solution using a spray dryer, while fine drops of the solution were sprayed, thus preparing spherical particles consisting of a mixture of a sugar polymer with the Ludox particles. The spherical particles were carbonized in a pyrolysis furnace at 800° C. for 1 hour in a nitrogen atmosphere, and then the silica was removed with HF. The remaining particles were washed with water and were finally dried in a vacuum. The synthesized porous carbon structure had a BET surface area of 760 $m^2/g$ and a single point pore volume of 0.908 $cm^3/g$. A SEM image of the prepared porous carbon structure is shown in FIG. 2.

EXAMPLE 2

Figure 3:
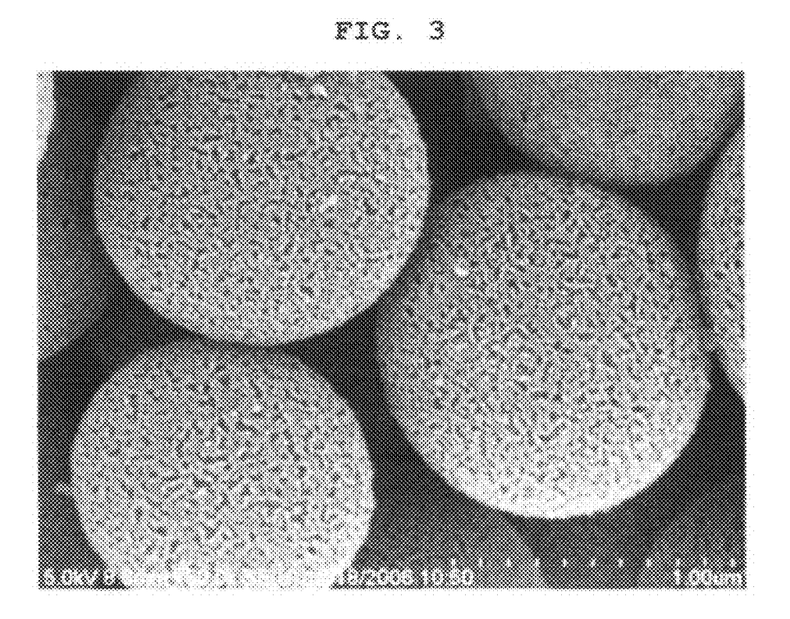
FIG. 3 is a SEM image of porous carbon particles prepared according to Example 2.

A spherical porous carbon structure was prepared in the same manner as in Example 1, except that 4.8 g of sodium sulfate in place of the silica particles, and 8 of sucrose, were used to prepare a spray solution, and water was used instead of HF to remove metal salts. The synthesized porous carbon structure had a BET surface area of 1340 $m^2/g$ and a single point pore volume of 2.9 $cm^3/g$. A SEM image of the prepared porous carbon structure is shown in FIG. 3.

EXAMPLE 3

Figure 4:
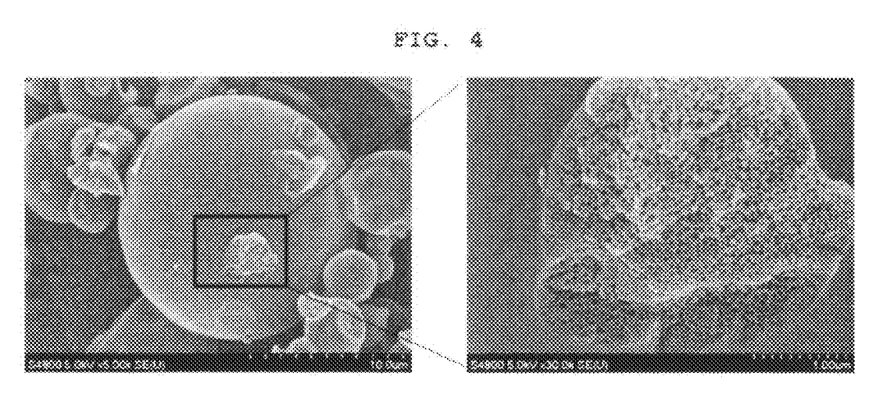
FIG. 4 is a SEM image of porous carbon particles prepared according to Example 3.

50 g of a 50-wt % aqueous solution of polyacrylamide (Aldrich) having a weight-average molecular weight of 10,000, 25 g of a 40-wt % aqueous solution of glyoxal (Aldrich), 25 g of $Na_2SO_4$, 10 g of $FeCl_3$ and 40 g of distilled water were mixed with each other, and the mixture was stirred at 60° C. for 3 hours to prepare a spray solution. The solution was spray-dried at 180° C. to obtain 61 g of a polymer complex. 10 g of the polymer complex was carbonized at 600° C., washed three times with distilled water, and then dried, thus obtaining 4.3 g of a carbon composite. The porous carbon structure thus prepared had a BET surface area of 738 $m^2/g$, and a SEM image of the porous carbon structure is shown in FIG. 4.

EXAMPLE 4

5.2 g of a carbon composite was obtained in the same manner as in Example 3, except that 10 g of $NaHCO_3$ was used instead of $Na_2SO_4$. The porous carbon structure thus prepared had a BET surface area of 658 $m^2/g$.

EXAMPLE 5

4.4 g of a carbon composite was obtained in the same manner as in Example 3, except that 25 g of NaCl was used instead of $Na_2SO_4$. The BET surface area of the porous carbon structure thus prepared was 450 $m^2/g$.

EXAMPLE 6

3.8 g of a carbon composite was obtained in the same manner as in 10 g of $MnCl_2$ was used instead of $FeCl_3$. The BET surface area of the porous carbon structure thus prepared was 627 $m^2/g$.

EXAMPLE 7

Figure 5:
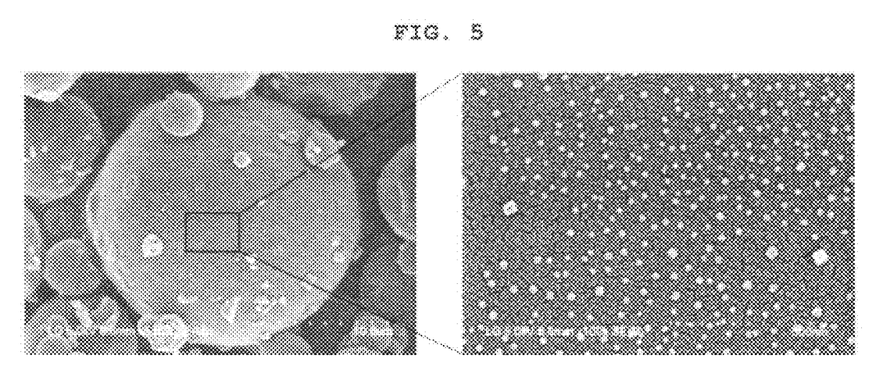
FIG. 5 is a SEM image of porous carbon particles prepared according to Example 7.

50 g of a 50-wt % aqueous solution of polyacrylamide (Aldrich) having a weight-average molecular weight of 10,000, 25 g of a 40-wt % aqueous solution of glyoxal (Aldrich), 25 g of tetraethylammonium hydroxide and 40 g of distilled water were mixed with each other, and the mixture was stirred at 60° C. for 3 hours, thus preparing a spray solution. The spray solution was spray-dried at 180° C. to obtain 46 g of a polymer composite. 10 g of the polymer composite was carbonized at 600° C. to obtain 3.6 g of a porous carbon structure. The BET surface area of the porous carbon structure thus prepared was 253 $m^2/g$, and a SEM image of the porous carbon structure is shown in FIG. 5.

COMPARATIVE EXAMPLE 1

50 g of a 50-wt % aqueous solution of polyacrylamide (Aldrich) having a weight-average molecular weight of 10,000, 25 g of a 40-wt % aqueous solution of glyoxal (Aldrich), 25 g of $Na_2SO_4$, 10 g of $FeCl_3$ and 40 g of distilled water were mixed with each other, and the mixture was stirred at 60° C. for 3 hours, thus preparing a spray solution. The spray solution was spray-dried at 180° C. to obtain 61 g of a polymer composite. 10 g of the polymer composite was washed three times with 30 g of distilled water to remove the metal salt and was then carbonized at 600° C.

Figure 6:
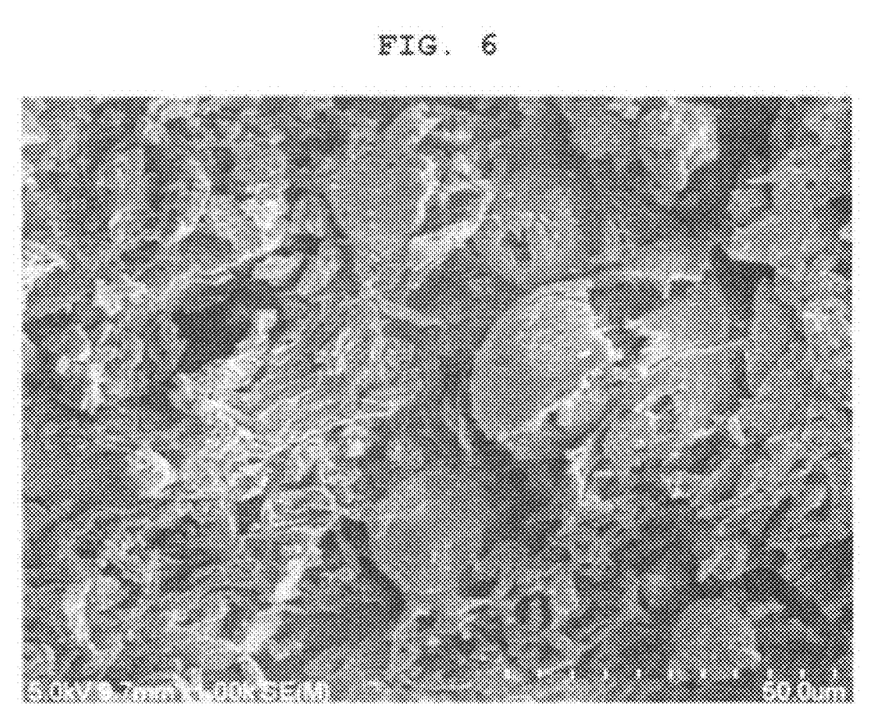
FIG. 6 is a SEM image of porous carbon particles prepared according to Comparative Example 1.

It could be observed that the carbon structure of Comparative Example 1, formed by performing the carbonization process after the removal of the template, had a specific surface are of 23 $m^2/g$, because the porous structure of the carbon particles was completely collapsed (see FIG. 6). Thus, it could be seen that the structural and physical properties of the prepared carbon structure were completely different depending on the order in which the template removal and the carbonization process were performed.

The invention claimed is:

1. A method for preparing a porous carbon structure, the method comprising the steps of:
   mixing a carbon precursor, a pyrolytic template, and a solvent, to prepare a spray solution, the carbon precursor being polyacrylamide; and
   subjecting the spray solution either to spray pyrolysis or to spray drying and then spray pyrolysis,
   wherein the pyrolytic template is pyrolyzed at a temperature range in which the carbon precursor is carbonized or at a temperature below the temperature range.

2. The method according to claim 1, wherein the carbon precursor contained in a carbon precursor/pyrolytic template composite is carbonized and crystallized by pyrolysis, while the template is pyrolyzed to form a pore structure.

3. The method according to claim 1, wherein the pyrolytic template is selected from the group consisting of cationic surfactants, anionic surfactants, nonionic surfactants and amphoteric surfactants.

4. The method according to claim 3, wherein the cationic surfactants are selected from the group consisting of quaternary ammonium salts, imidazolium salts, pyridinium salts, quinolinium salts, isoquinolinium salts, polyethyleneimine, polyprolyleneimine, polyallylamine, polylysine and polyamine.

5. The method according to claim 3, wherein the anionic surfactants are selected from the group consisting of alkyl sulfates, alkyl sulfonates, alkyl carboxylates, alkylbenzene carboxylates and alkylbenzene sulfonates.

6. The method according to claim 3, wherein the nonionic surfactants are selected from the group consisting of polyethylene oxides (PEO), polypropylene oxides (PPO) and a poly(ethylene oxide)-(propylene oxide) block copolymers.

7. The method according to claim 1, wherein the pyrolysis is carried out in a temperature range of 300-1500° C.

8. The method according to claim 1, wherein the prepared carbon structure has an average size ranging from 20 nm to 1000 μm.

9. A method for preparing a porous carbon structure, the method comprising the steps of:
   mixing a carbon precursor, a hard template and a solvent to prepare a spray solution, the hard template being a metal oxide;
   subjecting the spray solution either to spray pyrolysis or to spray drying and then spray pyrolysis, to form a carbonized carbon structure/hard template composite; and
   removing the template from the carbonized carbon structure/hard template composite.

10. The method according to claim 9, wherein the carbonized carbon structure/hard template composite is treated with water, an acid or a base to remove the template, thus forming a pore structure.

11. The method according to claim 9, wherein the metal oxide is selected from the group consisting of silica, alumina and titania.

12. The method according to claim 9, wherein the carbon precursor is selected from the group consisting of phenol-aldehyde resin, urea-aldehyde resin, aniline-aldehyde resin, polyimide, polyacrylonitrile, polystryrene, polydivinylbenzene, polyvinylpyridine, polypyrrole, polythiophene, polyaniline, perfuryl alcohol, polyacrylamide, cellulose, sugar, sugar polymers, carbohydrates, and mixtures thereof.

13. The method according to claim 9, wherein the pyrolsis is carried out in a temperature range of 300-1500° C.

14. The method according to claim 9, wherein the prepared carbon structure has an average size ranging from 20 nm to 1000 μm.

* * * * *